United States Patent [19]
Gunzel, Jr. et al.

[11] Patent Number: 5,409,166
[45] Date of Patent: Apr. 25, 1995

[54] BATTERY-POWERED PARTICULATE SPREADER

[75] Inventors: Rudolph M. Gunzel, Jr., Palm Springs; Donald J. Shanklin, Fullerton; Darcy E. Staggs, Orange; Roy K. Fujitaki, Altadena, all of Calif.

[73] Assignee: Natural Earth Technologies, Inc., San Francisco, Calif.

[21] Appl. No.: 71,286

[22] Filed: Jun. 2, 1993

[51] Int. Cl.6 ............................................. A01C 15/04
[52] U.S. Cl. ..................... 239/142; 239/344; 239/354; 239/361; 239/375; 239/526; 239/654
[58] Field of Search ............... 239/526, 530, 654, 375, 239/528, 142, 340, 344, 354, 355, 361; 366/287

[56] References Cited

U.S. PATENT DOCUMENTS

| | | |
|---|---|---|
| D. 327,823 | 7/1992 | Demarest . |
| 1,232,618 | 4/1917 | Smart ............................. 239/528 X |
| 1,516,660 | 11/1924 | Beach ............................. 239/528 X |
| 1,643,969 | 10/1927 | Tittemore et al. .................. 239/526 |
| 1,703,384 | 2/1929 | Birkenmaier . |
| 1,785,932 | 12/1930 | Brown et al. . |
| 2,088,551 | 7/1937 | Geldhof ........................ 366/287 X |
| 2,091,055 | 8/1937 | Roselund et al. . |
| 2,362,946 | 11/1944 | Stockdale ........................ 239/526 |
| 2,538,756 | 1/1951 | Braswell ......................... 239/654 |
| 2,770,912 | 11/1956 | Deem ............................. 239/654 |
| 2,937,813 | 5/1960 | Rinkewich ................... 239/526 X |
| 3,403,941 | 10/1968 | Solt . |
| 3,633,828 | 1/1972 | Larson ........................ 239/526 X |
| 3,994,437 | 11/1976 | Kitterman . |
| 4,071,170 | 1/1978 | Gunzel, Jr. et al. . |
| 4,426,039 | 1/1984 | Kwok . |
| 4,522,340 | 6/1985 | Gandrud ........................ 239/654 |
| 4,678,377 | 7/1987 | Bouchard . |
| 5,119,993 | 6/1992 | Gunzel, Jr. et al. . |

Primary Examiner—Andres Kashnikow
Assistant Examiner—Kevin Weldon
Attorney, Agent, or Firm—Christie, Parker & Hale

[57] ABSTRACT

A portable electric-powered particulate spreader has a housing having an inlet and an outlet. A reservoir for holding particulate material is located above the housing. A blower is located with a flow path extending from the inlet to the outlet for inducing air flow along the flow path. A particulate intake port is formed in a channel wall which encompasses an exhaust channel extending downstream from the blower to the outlet. A valve controls flow of particulate material from the reservoir to the particulate intake port. An agitator located between the reservoir and exhaust channel rotationally reciprocates and induces vibrations which assist the flow of particulate material. A foil in the exhaust channel produces a low static pressure in the which tends to draw particulate material from the reservoir into the air flow. Delays are built in so that the blower turns on before opening the valve is opened and the valve is closed before the blower is turned off.

18 Claims, 6 Drawing Sheets

BATTERY-POWERED PARTICULATE SPREADER

BACKGROUND OF THE INVENTION

The invention pertains to the field of devices for dispensing dry materials and, more particularly to a portable battery-powered spreader for particulate materials such as may be used for garden dusting or fertilizing.

Many mechanical devices exist that aid in the even dispensing and spreading of particulate material such as insecticide or fungicide dusts or granular particulate materials such as fertilizers. The simplest hand-held spreaders for granulated products are manually operated by a rotary crank which either directly or indirectly turns a rotor which dispenses the particulate material from a hopper on the apparatus. U.S. Pat. No. 4,140,280 discloses one such apparatus. A portable battery-operated apparatus for such use is disclosed by U.S. Pat. No. 3,993,225. A somewhat different approach is disclosed in U.S. Pat. No. 4,678,377, in which a powder is contained in a flexible and manipulable pouch open at two ends through which a flow of air is forced by the drive mechanism to eject the dust.

One problem encountered in any mechanism for the dispensing of powdered material is the tendency of the material itself to lump and clog (as described in U.S. Pat. No. 4,712,716, which discloses a mechanism for metering dusting powder to assure even flow) or to bridge (as described in U.S. Pat. No. 4,071,170).

U.S. Pat. No. 4,071,170 discloses a portable motor-driven dusting apparatus which incorporates a mechanism to agitate the powdered material as it is being fed to the rotary blower to assure uniform rate of flow and avoid clogging or bridging problems.

U.S. Pat. No. 5,199,993 discloses a battery-powered spreader for dispensing either dust-like or granular particles such as insecticides or fertilizer, respectively.

In battery-powered spreaders of the prior art, the particulate material is introduced directly to the blower so that the flow of air and material passes directly through the blower vanes. Especially with larger and heavier particles, the moving blades have a tendency to impact the particles resulting in unpredictable impact trajectories and ultimately providing a nonuniform discharge pattern. This also entails a number of wear-related problems and thus limits the spreaders' use with particulate material having physical or chemical properties which might damage or interfere with the blower.

The situation is exacerbated when the spreader is designed so that the blower is turned on simultaneously with the opening of the valve which controls flow of material from the reservoir. On starting, this may cause material to accumulate in the blower before the blower can get up to speed, and upon stopping, may leave accumulations of material in the blower. Large accumulations of material may stall the motor. Additionally, the action of the blower may be injurious to the particulate matter which is to be spread. This is especially important in the case of seeds which may have a fragile nature.

SUMMARY OF THE INVENTION

Thus, there is provided in practice of this invention according to a presently preferred embodiment a portable electric-powered particulate spreader having a housing with an inlet and an outlet. A reservoir for holding particulate material is located above the housing. A blower is located within a flow path extending from the inlet to the outlet for inducing air flow along the flow path. A particulate intake port is formed in a channel wall which encompasses an exhaust channel extending downstream from the blower to the outlet. A valve controls flow of particulate material from the reservoir to the particulate intake port. The spreader has an agitator which reciprocates rotationally to improve flow of material from the reservoir. The spreader further has a control mechanism which provides a delay between the starting of the blower and the opening of the valve, and a delay between the closing of the valve and the turning off of the blower.

BRIEF DESCRIPTION OF THE DRAWINGS

These and other features and advantages of the present invention will be appreciated as the same becomes understood by reference to the following detailed description, and considered in connection with the accompanying drawings wherein:

FIG. 1 is a partial side sectional view of a battery-powered particulate spreader constructed according to principles of the present invention, taken substantially along a parting plane of the spreader housing;

FIG. 2 is a partial side sectional view of the spreader of FIG. 1 showing internal features in elevation;

FIG. 3 is a partial top sectional view of the spreader of FIG. 1;

FIG. 4 is a partial top sectional view of the spreader of FIG. 1 taken along line 4—4;

FIG. 5 is a partial side section of the spreader of FIG. 1;

FIG. 6 is a side view of an agitator arm and collar section of the spreader of FIG. 3 taken along line 6—6;

FIG. 7 is a side elevation view of the spreader of FIG. 1 shown with a hopper for containing particulate material; and FIG. 8 is a partial top sectional view of an agitator and collar section of the spreader of FIG. 1 taken along line 8—8.

DETAILED DESCRIPTION

A battery-powered particulate spreader has a housing 20 which is formed in left and right halves. As shown in FIG. 7, the housing is formed with a handle 22 at the rear end of the housing. The housing has a reservoir port 24 for receiving a reservoir 35 (shown as a hopper). Air intake vents 26 are provided in both sides of the housing. The spreader further has an outlet 28 at the front end of the housing.

As shown in FIG. 1, a blower unit has an electric DC motor 32 having a motor shaft 34 which defines a blower axis 200. A rotary vane 36 is attached to the motor shaft and has four blades 38. The blower has a blower housing 40 mounted within the spreader housing and similarly formed in left and right halves, 40*a* and 40*b*, respectively. The blower housing encompasses the rotary vane and has an intake funnel 42 extending upwardly of the vane. The intake funnel is for passage of air into the blower and is not normally for particulate material. At the base of the blower housing, a seal 43 seals the motor shaft and blower housing. A channel wall 44 encompasses an exhaust channel which extends from the blower to the outlet.

A split blower housing collar 46 is formed above and slightly offset from the intake funnel. A retaining collar 48 is clamped between the two halves of the blower housing collar and extends upwardly to abut the housing around the reservoir port. The retaining collar is unitarily formed so as to function as a smooth insert within the split blower housing. The retaining collar has bayonet receiving slots 52 for receiving bayonet fittings 53 on the reservoir and an annular shoulder 54 for sealing with a mouth 55 of the reservoir.

A particulate tube 56 formed integrally with the halves of the blower housing extends diagonally from the base of the blower housing collar to the exhaust channel, forming a particulate intake port 58 in the exhaust channel wall.

An agitator 60 having an inclined portion 62 which slopes down toward the particulate tube, is mounted in the retaining collar. The agitator has a downwardly extending axle 64, which defines an agitator axis 202. The axle extends through the retaining collar to be received by a bore 66 at the base of the blower housing collar. The blower housing collar, retaining collar and agitator are all open at the upper end of the particulate tube. However, a gate 68, pivotal about a gate axis 204, is mounted adjacent the upper end of the particulate tube.

Figure 1:
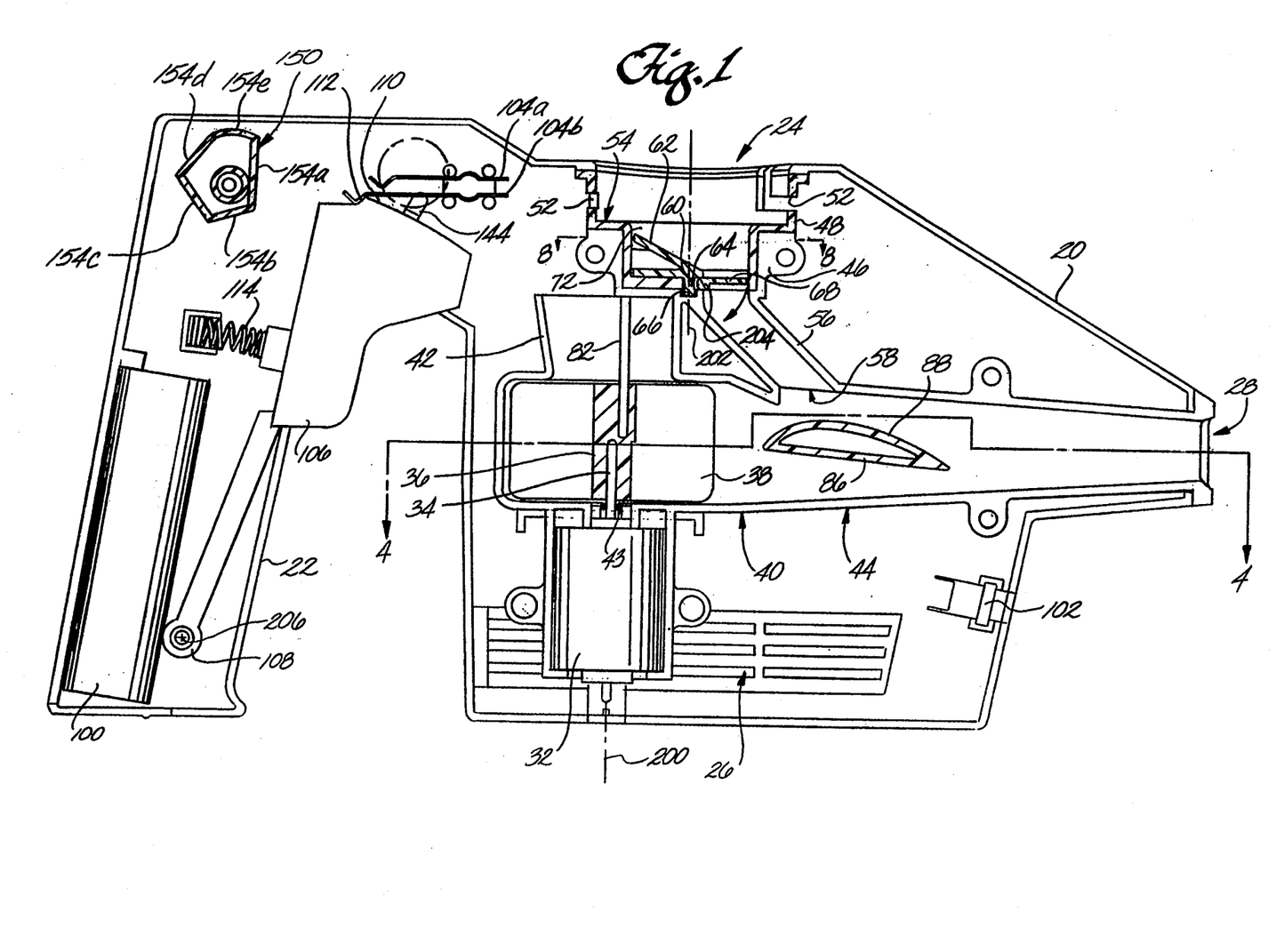
Figures 3, 8:
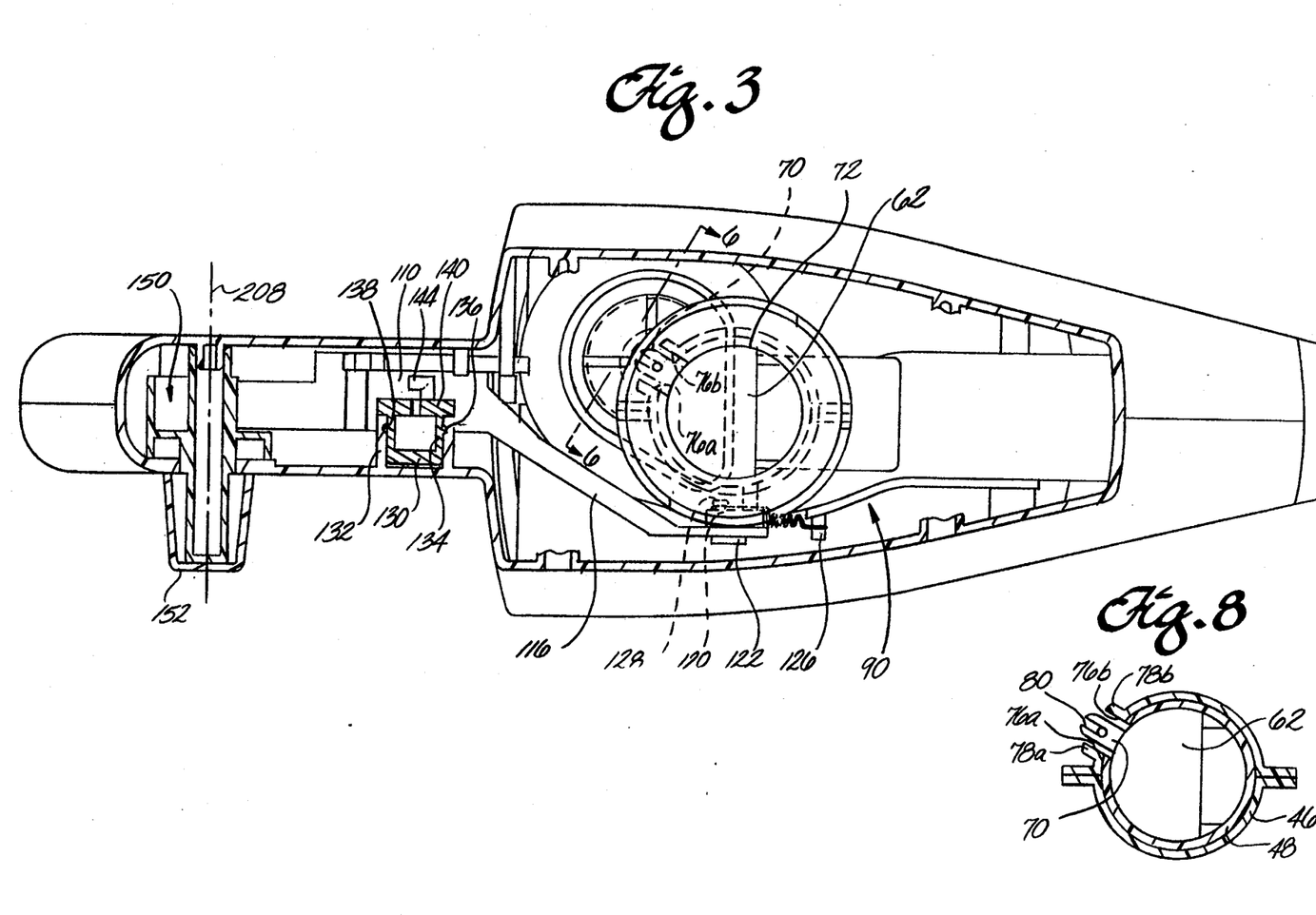
Figure 6:
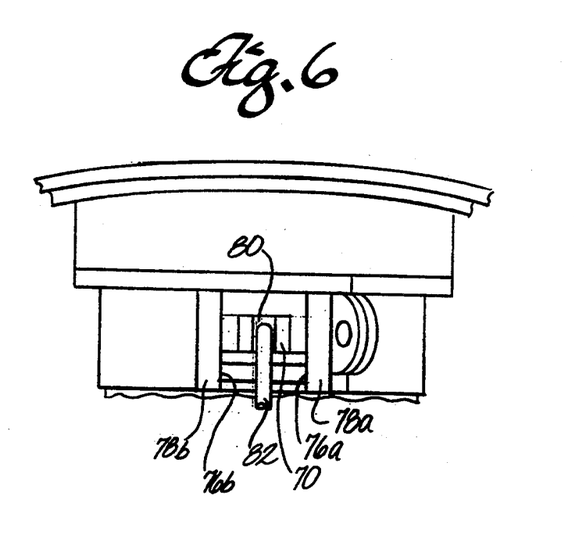
Figure 7:
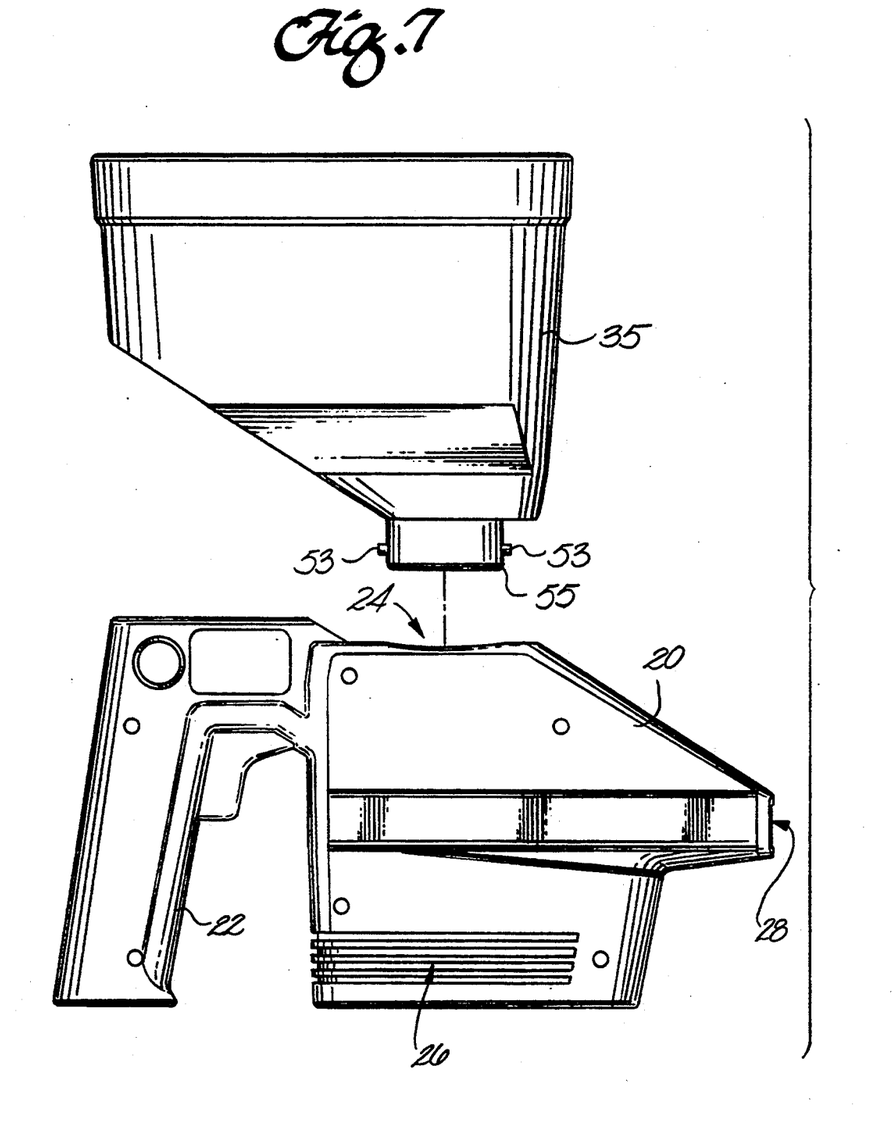

As shown in FIGS. 3, 6 and 8 the agitator has an arm 70 extending beyond a perimeter portion 72, which perimeter portion is at uniform radius from the agitator axis. The agitator arm extends through coextensive slots in the blower housing collar and retaining collar. The slots are defined by slot edges 76a and 76b. Bosses 78a and 78b are formed in the blower housing collar at the slot edges 76a and 76b, respectively. The agitator arm has slot 80 which receives the upper end of an agitator shaft 82. The lower end of the agitator shaft is mounted in the core of the rotary vane offset from the blower axis (FIG. 1).

Figure 4:
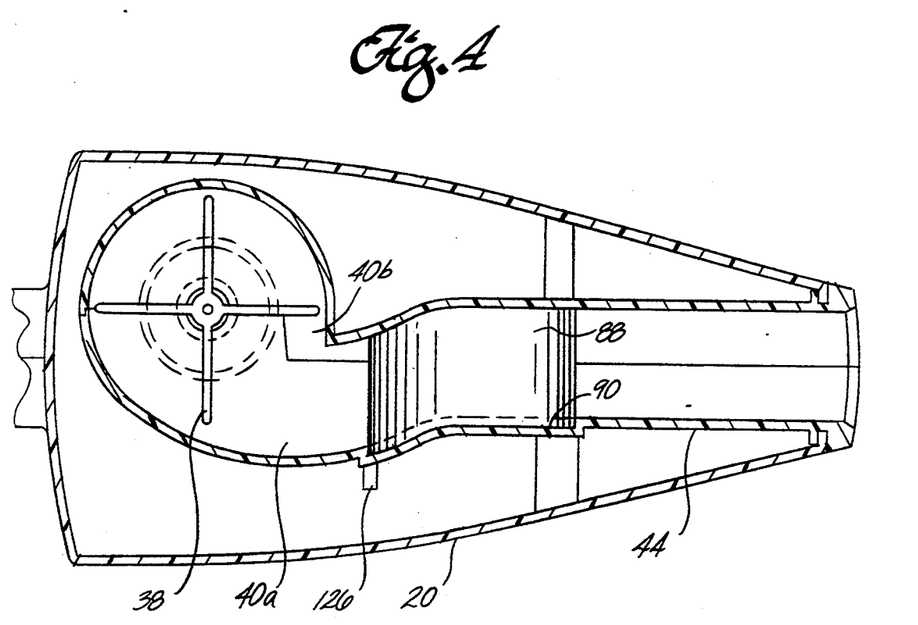

A foil 86 is formed unitarily with the left half of the blower housing. The foil is located within the exhaust channel adjacent to the particulate intake port. The cambered or lift-inducing surface 88 of the foil faces the particulate intake port for inducing a low pressure area and drawing particulate material into the air stream through the exhaust channel. As shown in FIG. 4, the foil extends across the exhaust channel and is received by a pocket 90 in the right half of the blower housing.

A rechargeable battery 100 comprising a plurality of nickel cadmium cells is provided in the handle to power the motor. A recharging jack 102 is provided for recharging the battery. A switch having upper and lower electrical contacts, 104a and 104b, respectively, is provided for turning on and off the motor. The switch, battery, motor and jack are connected by wiring (not shown), suitable configurations of which will be apparent to those skilled in the art.

A trigger 106 is pivotally mounted in the housing via a trigger lever 108. The trigger has a contact-engaging surface 110 at a uniform radius from a trigger pivot axis 206 for engaging the lower electrical contact and operating the switch. With the trigger in an OFF position, as shown in solid lines in FIGS. 1 and 2, the lower contact is accommodated by a recess 112 at the aft end of the contact-engaging surface so that the upper and lower contacts are separated and the switch is in an OFF position. The trigger may be drawn back against force from a compression spring 114 so that the lower contact disengages from the recess and is elevated into contact with the upper contact so as to establish an ON switch position as shown by the phantom lower contact in FIG. 2.

Figure 2:
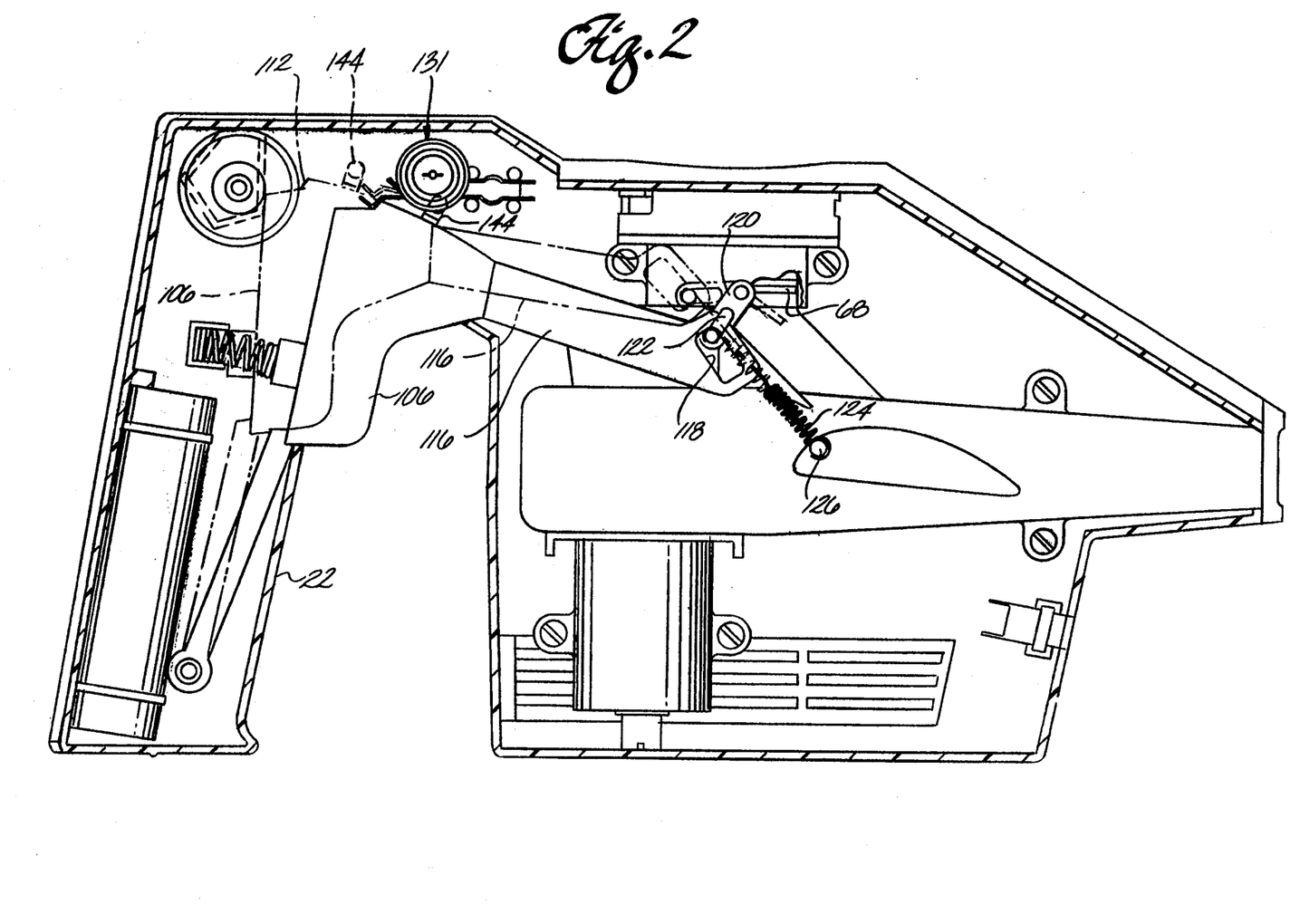

With the switch in the ON position, the blower is turned on. As shown in FIGS. 2 and 3, an arm 116 extends forward from the trigger and is formed unitarily therewith. At its forward end, the arm has a slot 118 which extends circumferentially relative to the trigger pivot axis 206. A lever 120 is connected at one end to the gate and has at the other end an L-shaped lever finger 122 which extends through the slot 118.

A spring 124 has a lower end wrapped around a boss 126 extending from a raised area of the right half of the blower housing outside the pocket 90 for the foil. At its upper end, the spring wraps around a boss 128 extending from the lever 120 at the opposite side of the lever from the lever finger 122. Under tension, the spring engages the lever so as to bias the gate toward a closed position as shown in solid lines in FIG. 2. With the trigger in the solid line OFF position of FIG. 2, the lever finger 122 lies adjacent the upper end of the slot 118; that is, the arm on the trigger is pivoted down relative to the finger. As the trigger is drawn back from this position, it does not exert force on the lever 120 until the lower end of the slot reaches the finger. From this point, as the trigger is pulled further back, it rotates the lever clockwise as shown in FIG. 2, thereby opening the gate as shown by phantom lines in FIG. 2.

A damper 131 is used for delaying stopping of the motor until after the gate is closed. The damper comprises a sleeve 132 formed unitarily with the right half of the housing and a plug 134 which is encompassed by the sleeve. The plug is rotatable within the sleeve and is axially secured by an annular rib 136 projecting outwardly from the plug, which rides in a circumferential channel 138 formed in the inner annular surface of the sleeve. A viscous liquid is provided between the plug and sleeve such that shearing of the liquid provides resistance to the relative rotation of the plug and the sleeve.

Figure 5:
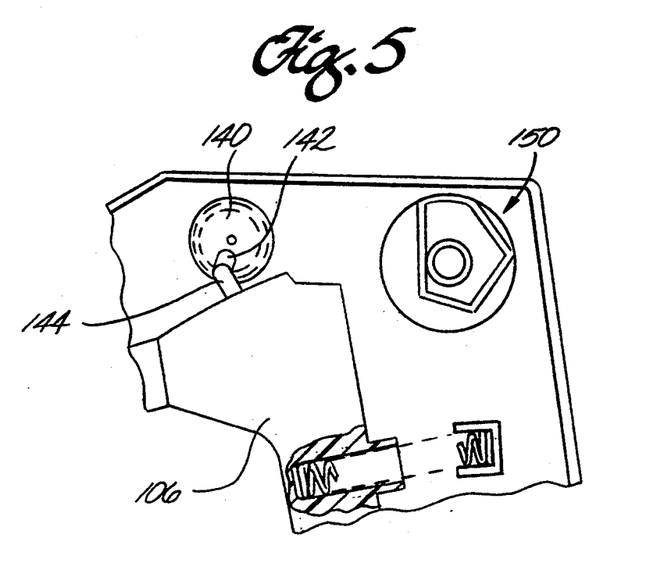

The plug has an end-plate 140 with a radial slot 142 (FIG. 5). An L-shaped damper finger 144 extends upwardly from the contact-engaging surface of the trigger and is engageable with the radial slot. When the trigger moves rearwardly, the finger engages the slot and rotates the damper in one direction (counterclockwise in FIG. 5). When the trigger is released, the finger engages the slot and the damper retards return of the trigger.

As shown in FIGS. 1 and 3, a stop cam 150 is provided for restricting the rearward motion of the trigger. The stop cam is rotatable about a stop axis 208 by means of a control knob 152 on the side of the housing. The stop cam has a plurality of sections 154a, 154b, 154c, 154d, 154e, each being a different radial distance from the stop axis. Accordingly, each section when turned to face the trigger will restrict the trigger's motion to different degrees, thus limiting the opening of the gate to different degrees and thus controlling material flow rate.

In operation, the hopper is attached to the housing at the reservoir port and loaded with the particulate material to be spread. The stop cam may be adjusted by the control knob to preselect an approximate flow rate of particulate material (the actual rate will be dependent upon the properties of the material). As the user pulls back on the trigger, the lower switch contact is pushed upwardly to engage the upper switch contact so as to start the motor, as mentioned above. The motor induces an air flow from outside the housing through the air intake vents, which act as an inlet, along a flow path extending upward between the housing and blower housing, then down through the intake funnel to the rotary vane, forward into the exhaust channel, around the foil and then out through the outlet to form a jet extending forward out of the spreader. The flow passing around the foil is split into an upper portion above the foil and a lower portion below the foil. As the lift-inducing surface of the foil faces the particulate intake port, an area of low static pressure is formed adjacent the particulate intake port.

As the trigger is pulled back further, the lower end of the slot 118 comes in contact with the lever finger 122. Also, the damper finger 144 is engaged with the radial slot 142 so as to rotate the damper plug within the sleeve. Accordingly, it can be seen that resistance from the viscous fluid in the damper serves to retard the movement of the trigger and cause a delay between the time the blower is turned on and the time the lower end of the slot 118 reaches the lever finger 122. The delay due to the lost motion connection between the slot and finger permits the motor to start before material flows into the exhaust channel.

As the trigger is pulled back still further, however, the trigger arm 116 acts upon the lever 120 so as to open the gate. As the trigger is pulled back further, the damper finger 144 disengages from the radial slot 142, as shown in phantom in FIG. 2, and continues moving rearwardly until the trigger engages one of the sections of the stop cam. Accordingly, it can be seen that the orientation of the stop cam, by controlling the movement of the trigger, controls the degree to which the gate is opened and thereby the flow rate of material.

With the gate open, particulate material from the hopper is drawn into the particulate tube, both by gravity and by an entrainment effect from the area of reduced static pressure at the particulate intake port. The material is entrained in the air in the upper flow section which then mixes with the air in the lower flow section to be propelled through the outlet to be spread about a target area selected by the user. A foil is used to reduce pressure at the particulate intake port to help provide reduced pressure in the upper flow section while reducing interference with the flow in the lower section so as to provide minimized energy consumption.

With the motor on, the agitator shaft 82 moves in a circular pattern and thus moves back and forth within the slot 80 of the agitator arm 70 while causing the agitator arm to reciprocate rotationally about the agitator axis. The reciprocation of the agitator tends to loosen any clumps of particulate material in the retaining collar, and the presence of the inclined portion of the agitator helps direct flow of particulate material into the particulate tube.

The slot edges 76a and 76b (and thus bosses 78a and 78b) are positioned so that the agitator arm alternately contacts the edges as the agitator is reciprocated. This produces a vibration of the blower housing collar and retaining collar 48 which is transmitted to the reservoir. The vibration breaks up any bridging of dust-like particles which may otherwise occur in the reservoir or retaining collar. It also helps to further dislodge any material which might stick to the retaining collar or sides of the reservoir. It is noted that dimensions and spacing should be chosen to insure a light tapping vibration so as to avoid excessive wear and energy consumption. Further, the dimensions of the agitator, the retaining collar and the slots are chosen to provide clearances to allow any small pieces of the material leaking past the agitator to fall into the funnel and enter the air flow there.

To stop spreading material, the trigger is released. It proceeds freely forward, propelled by both the compression spring 114 and the spring 124 until the damper finger 144 reengages the radial slot of the damper. At this point, the forward motion of the trigger is resisted by the damper. Accordingly, there is a delay between the time the lever finger 122 disengages from the lower end of the slot 118 to close the gate and the time that the lower contact of the switch reengages the recess in the trigger to turn off the motor. The delay thus insures that material will not be left in the exhaust channel and blower housing when the spreader is turned off.

In the presently preferred embodiment, the spreader housing, blower housing, rotary vane, trigger, control knob, stop cam and hopper are formed of a molded ABS material. The agitator, retaining collar, plug, gate and gate lever are formed of a molded acetal resin. The springs and shafts are formed of stainless steel. The viscous liquid is a silicone gel. The viscosity of the liquid and dimensions (radius and gap thicknesses) of the damper may be chosen to provide the desired delays for the spring constants selected. A delay of approximately one-half to one second is presently preferred to balance the advantages mentioned above with the desirability of being able to produce sequential bursts from the spreader.

To more clearly show the features of the present invention, a number of well-known manufacturing and assembly features such as ribs, bosses, interlock features, screws, etc. are not shown in the drawings. Such features are a matter of choice by a designer when designing for manufacture and assembly. Other well known features, such as wiring, are similarly omitted. Furthermore, many spacings and thicknesses may not be drawn to a particular scale and would be optimally determined by a designer of ordinary skill in the art.

While the preferred embodiment of a battery-powered particulate spreader has been described and illustrated herein, other constructions will be apparent to those skilled in the art. By way of example, in the presently preferred embodiment, the two-piece housing serves as an outer housing while the two-piece blower housing serves as an inner housing. It is clear that the features of these two housings may be substantially combined into a single unitary housing which, if similarly molded, would have skeletal-like features. The aesthetic features of a housing such as that of the present embodiment may be provided such as by means of left and right facade panels or a cover piece. In such a case, it can be seen that the single housing would serve to encompass the flow path, and that the exhaust channel would be unitarily formed with that housing.

The housing may also be made other than of a molded plastic, such as of metal for a heavy-duty commercial application, and the components may be laid out in different arrangements. Although a foil is used to reduce pressure adjacent to the particulate intake port, other configurations of the exhaust channel are possible to produce a similar effect.

Furthermore, the agitator shaft may comprise a mere extension of the motor shaft, bent so as to achieve the desired offset. Although one configuration and orientation of a rotary vane is disclosed, numerous other blowers are equally applicable to the present invention. For instance, a blower comprising an axial flow fan having an axis aligned substantially with the exhaust channel may be used. In such a case, an alternative mechanism could be used to drive the agitator. Although the reservoir shown herein is an open hopper, it may equivalently be a closed container. A screw fitting may replace the bayonet fitting of the reservoir, and the reservoir may further be permanently attached or integrally or unitarily formed with the housing, such as comprising a well formed in the housing.

Although the presently preferred embodiment shows one construction of a lost-motion linkage comprising a closed slot on a trigger arm engaging a finger of a lever for operating a flapper-type valve, many other versions of a lost-motion linkage would be possible as are other valve constructions. Although a rotational damper utilizing liquid viscosity is illustrated, non-rotational configurations are possible as are dampers based on hydraulics or friction.

Additionally, the slots in the retaining collar and blower housing collar need not be coextensive. The bosses may be formed in either collar or eliminated altogether. They may be replaced by leg-like stops extending from the collars or from another member.

The control knob may be positioned on the back of the handle and the stop cam may have a spiral ramp for engaging a rear portion of the trigger. Other arrangements of the flow control, as well as other parts of the apparatus will be apparent. It is therefore to be understood that, within the scope of the appended claims, the invention may be practiced otherwise than specifically described.

What is claimed is:

1. A portable electric-powered device for spreading particulate material comprising:
    a housing;
    a reservoir for holding particulate material above the housing;
    an inlet to the housing and an outlet at a front of the housing defining a flow path therebetween from upstream to downstream;
    a blower located within the flow path for inducing an air flow from the inlet to the outlet, the flow path comprising a blower exhaust channel located between the blower and the outlet and encompassed by a channel wall;
    a particulate intake port in the channel wall below the reservoir and downstream from the blower;
    a valve for controlling flow of particulate material from the reservoir to the particulate intake port; and
    a flat body located adjacent the particulate intake port and extending substantially across the exhaust channel having a first face adjacent to the particulate intake port and a second face facing away from the particulate intake port, which divides air flow between the blower and the outlet into paths in parallel flow across the first and second faces of the body for reducing static pressure within the flow path adjacent to the particulate intake port.

2. The device of claim 1 wherein the body comprises a foil having a lift inducing surface facing the particulate intake port.

3. The device of claim 1 further comprising control means for turning the blower on and off and for opening and closing the valve, which control means turns the blower on before opening the valve and closes the valve before turning the blower off.

4. The device of claim 1 further comprising control means for turning the blower on and off and for opening and closing the valve, which control means turns the blower on before opening the valve.

5. The device of claim 1 further comprising control means for turning the blower on and off and for opening and closing the valve, which control means closes the valve before turning the blower off.

6. The device of claim 1 further comprising an agitator between the reservoir and the flow path and coupled to the blower for rotational reciprocation about an agitator axis.

7. The device of claim 1 wherein the reservoir comprises an open hopper having a mouth which bears a bayonet fitting and the housing comprises a bayonet fitting socket for receiving the hopper.

8. The device of claim 7 wherein the control and delay means comprise:
    a switch movable between an ON and an OFF position for turning the blower on and off;
    a trigger coupled to the switch;
    a lost-motion linkage coupled to the valve and to the trigger so that the trigger is movable between:
        a first trigger position wherein the valve is closed and the blower is off;
        a second trigger position wherein the valve is closed and the blower is on; and
        a third trigger position wherein the valve is open and the blower is on.

9. A portable electric-powered device for spreading particulate material comprising:
    a housing;
    a reservoir for feeding particulate material to the housing;
    an inlet to the housing and an outlet at a front of the housing defining an air flow path therebetween from upstream to downstream;
    a blower located within the flow path for inducing an air flow from the inlet to the outlet;
    a valve for establishing selective communication between the reservoir and the flow path;
    control means for turning the blower on and off and for opening and closing the valve; and
    delay means for closing the valve before turning the blower off,
    wherein the control and delay means comprise:
        a switch movable between an ON and an OFF position for controlling electric current for turning the blower on and off; and
        a damper coupled to the switch for delaying movement of the switch between the ON and OFF positions.

10. The device of claim 9 wherein the damper comprises:
    a sleeve;
    a plug encompassed by the sleeve; and
    a viscous liquid between the sleeve and the plug.

11. The device of claim 10 further comprising means for rotating the plug relative to the sleeve.

12. The device of claim 10 wherein the sleeve is connected to the housing and the plug and the means for rotating the plug relative to the sleeve comprises an end plate having a radial slot, which device further comprises a finger extending from the trigger and engageable with the radial slot.

13. The device of claim 9 wherein the control and delay means turn the blower on before opening the valve.

14. A portable electric-powered device for spreading particulate material comprising:

a housing;

a reservoir for holding particulate material attachable to the housing;

an inlet and an outlet at a front of the housing defining a flow path therebetween from upstream to downstream;

a blower located within the flow path for inducing an air flow from the inlet to the outlet, the blower including a blower axis;

a valve between the reservoir and the flow path;

an agitator between the reservoir and the flow path;

an agitator drive shaft offset from the blower axis and connected to the blower, which agitator drive shaft engages the agitator at a location offset from the agitator axis, the agitator comprising
  a first perimeter portion at a uniform radius from the agitator axis; and
  an arm engaging the agitator drive shaft and extending radially beyond the first perimeter portion; and means for coupling the agitator to the blower for rotational reciprocation about an agitator axis.

15. The device of claim 14 further comprising a collar encompassing the agitator and having a slot defined by first and second side edges, wherein the agitator arm extends through the slot.

16. The device of claim 15 wherein the agitator arm alternately contacts the first and second slot side edges as the agitator is reciprocated so as to produce a vibration which is transmitted to the reservoir.

17. The device of claim 16 wherein the agitator arm has a slot for receiving the agitator shaft.

18. A portable electric-powered device for spreading particulate material comprising:

a housing;

a reservoir for holding particulate material;

means for attaching the reservoir to the housing;

an inlet to the housing and an outlet at a front of the housing defining a flow path therebetween from upstream to downstream;

a blower, having a blower axis, located within the flow path for inducing an air flow from the inlet to the outlet, the flow path comprising a blower exhaust channel located between the blower and the outlet and encompassed by a channel wall;

a particulate intake port in the channel wall below the reservoir and downstream from the blower;

a valve for controlling flow of particulate material from the reservoir to the particulate intake port;

a foil having a lift inducing surface facing the particulate intake port and extending substantially across the exhaust channel;

a switch movable between an ON and an OFF position for turning the blower on and off;

a trigger coupled to the switch;

a lost-motion linkage coupled to the valve and to the trigger so that the trigger is movable between:
  a first trigger position wherein the valve is closed and the blower is off;
  a second trigger position wherein the valve is closed and the blower is on; and
  a third trigger position wherein the valve is open and the blower is on;

a damper coupled to the switch for delaying movement of the switch between the ON and OFF positions comprising:
  a sleeve;
  a plug encompassed by the sleeve;
  a viscous liquid between the sleeve and the plug; and
  means for rotating the plug relative to the sleeve; and an agitator, rotationally reciprocable about an agitator axis, having a first perimeter portion at a uniform radius from the agitator axis and an arm extending radially beyond the first perimeter portion, the arm having a slot for engaging an agitator drive shaft, which agitator drive shaft is connected to the blower and offset from the blower axis.

* * * * *